US011399205B2

(12) United States Patent
Ahn et al.

(10) Patent No.: US 11,399,205 B2
(45) Date of Patent: Jul. 26, 2022

(54) USB-C DMP DEVICE AND PLAYBACK METHOD FOR SAME

(71) Applicant: O2O CO., LTD., Chuncheon-si (KR)

(72) Inventors: Sung Min Ahn, Seongnam-si (KR); Dong Gil Park, Seongnam-si (KR); Ki Min Yun, Seoul (KR)

(73) Assignee: O2O CO., LTD., Chuncheon-si (KR)

( * ) Notice: Subject to any disclaimer, the term of this patent is extended or adjusted under 35 U.S.C. 154(b) by 0 days.

(21) Appl. No.: 17/418,840

(22) PCT Filed: Mar. 14, 2019

(86) PCT No.: PCT/KR2019/002960
§ 371 (c)(1),
(2) Date: Jun. 27, 2021

(87) PCT Pub. No.: WO2020/158997
PCT Pub. Date: Aug. 6, 2020

(65) Prior Publication Data
US 2022/0078504 A1    Mar. 10, 2022

(30) Foreign Application Priority Data
Jan. 30, 2019  (KR) .......................... 10-2019-0012071

(51) Int. Cl.
*H04N 21/422*    (2011.01)
*H04N 21/436*    (2011.01)
*H04N 21/4363*    (2011.01)

(52) U.S. Cl.
CPC ..... *H04N 21/422* (2013.01); *H04N 21/42203* (2013.01); *H04N 21/4363* (2013.01);
(Continued)

(58) Field of Classification Search
CPC ........... H04N 21/422; H04N 21/42203; H04N 21/43615; H04N 21/4363; H04N 21/43635; H04N 21/43637
See application file for complete search history.

(56) References Cited

U.S. PATENT DOCUMENTS 9,819,991 B1    11/2017  Rajagopalan et al.
9,837,083 B1    12/2017  List
(Continued)

FOREIGN PATENT DOCUMENTS

EP    3062214 A1 *   8/2016  ........... G06F 3/1454
KR    10-2009-0071855 A    7/2009
(Continued)

OTHER PUBLICATIONS

International Search Report for PCT/KR2019/002960 dated Oct. 29, 2019 from Korean Intellectual Property Office.

*Primary Examiner* — Fernando Alcon
(74) *Attorney, Agent, or Firm* — Revolution IP, PLLC

(57) ABSTRACT

An USB-C DMP device includes: a USB terminal for connecting to an input port of a monitor or a television (TV); a Wi-Fi module for receiving a mirroring signal from a mobile terminal through Wi-Fi communication; a converter module for converting the mirroring signal received by the Wi-Fi module into a USB-C signal and transmitting the USB-C signal to the monitor or TV through the USB terminal; and a system-on-chip (SoC) module for controlling the Wi-Fi module to receive the mirroring signal from the mobile terminal, and controlling the converter module to convert the mirroring signal received by the Wi-Fi module into the USB-C signal.

4 Claims, 3 Drawing Sheets

(52) U.S. Cl.
 CPC . *H04N 21/43615* (2013.01); *H04N 21/43635* (2013.01); *H04N 21/43637* (2013.01)

(56) References Cited

U.S. PATENT DOCUMENTS

| | | | | |
|---|---|---|---|---|
| 2006/0075429 | A1* | 4/2006 | Istvan | H04N 7/163 725/39 |
| 2008/0100747 | A1* | 5/2008 | Lin | H04N 5/44 348/553 |
| 2013/0152149 | A1* | 6/2013 | Park | H04N 21/43632 725/114 |
| 2013/0208135 | A1* | 8/2013 | Han | H04N 21/4223 348/211.9 |
| 2014/0195248 | A1* | 7/2014 | Chung | G10L 15/22 704/275 |
| 2016/0196220 | A1 | 7/2016 | Perez et al. | |
| 2017/0237930 | A1* | 8/2017 | Kim | H04N 21/43637 348/554 |
| 2017/0324794 | A1* | 11/2017 | Jeong | H04L 29/08657 |
| 2018/0089134 | A1 | 3/2018 | Roberts-Hoffman et al. | |
| 2019/0172451 | A1* | 6/2019 | Yoo | G06F 1/3265 |

FOREIGN PATENT DOCUMENTS

| | | |
|---|---|---|
| KR | 10-2010-0099235 A | 9/2010 |
| KR | 10-1274619 B1 | 6/2013 |
| KR | 10-2017-0101972 A | 9/2017 |

\* cited by examiner

USB-C DMP DEVICE AND PLAYBACK METHOD FOR SAME

CROSS REFERENCE TO PRIOR APPLICATIONS

This application is a National Stage Application of PCT International Patent Application No. PCT/KR2019/002960 filed on Mar. 14, 2019, under 35 U.S.C. § 371, which claims priority to Korean Patent Application No. 10-2019-0012071 filed on Jan. 30, 2019, respectively, which are all hereby incorporated by reference in their entirety.

TECHNICAL FIELD

The present invention relates to a digital media player (DMP) device and a playback method thereof, and specifically, to a USB-C (USB type-C) DMP device and a playback method thereof.

BACKGROUND ART

Among conventional digital media player (DMP) products, there is a stick-type high definition multimedia interface (HDMI) DMP device that may be inserted into an HDMI input port on the back side of a TV or a monitor.

The stick-type HDMI DMP device receives an HDMI signal from a mobile terminal through a Wi-Fi communication without a separate cable to transmit the HDMI signal to the TV or the monitor through the HDMI input port.

The stick-type HDMI DMP device is very convenient because it can be used without a cable, but there is a problem that a separate power adaptor should be provided because power cannot be supplied through the HDMI port.

Meanwhile, since the stick-type HDMI DMP device is installed on the back side of the TV due to product characteristics, the stick-type HDMI DMP device has a structural limitation in implementing a voice recognition function. For voice recognition, since a microphone should be opened toward a user on the front side of the TV, a remote voice recognition function cannot be implemented in the current structure.

RELATED ART LITERATURE

Patent Literature (Patent Document 1) Korean Patent No. 10-2010-0099235
(Patent Document 2) Korean Patent No. 10-2009-0071855

DISCLOSURE

Technical Problem

An object of the present invention is to provide a USB-C DMP device.

Another object of the present invention is to provide a playback method of a USB-C DMP device.

Technical Solution

A USB-C DMP device according to the object of the present invention described above includes a USB terminal for connecting to an input port of a monitor or a TV; a Wi-Fi module that receives a mirroring signal from a mobile terminal through Wi-Fi communication; a converter module that converts the mirroring signal received by the Wi-Fi module into a USB-C (USB type-C) signal and transmits the USB-C signal to the monitor or the TV through the USB terminal; and a system-on-chip (SoC) module that controls the Wi-Fi module to receive the mirroring signal from the mobile terminal, and controls to convert the mirroring signal received by the Wi-Fi module into a USB-C signal by the converter module.

Here, the converter module may convert a mirroring signal composed of an HDMI signal into the USB-C signal or convert the mirroring signal composed of the HDMI signal into a display port signal and then convert the display port signal into the USB-C signal.

In addition, the USB-C DMP device may further include a Bluetooth module that receives a voice signal from a voice recognition Bluetooth speaker through Bluetooth communication.

In addition, the converter module may convert the voice signal received by the Bluetooth module into the USB-C (USB type-C) signal and transmit the USB-C signal to the monitor or the TV through the USB terminal.

In addition, the SoC module may control the Bluetooth module to receive the voice signal from the voice recognition Bluetooth speaker, and to convert the voice signal received by the Bluetooth module into the USB-C signal by the converter module.

In addition, the USB-C DMP device may further include a power delivery module that is supplied with power from the monitor or the TV and provides the power to the Wi-Fi module, the Bluetooth module, the converter module, and the system-on-chip module.

A playback method of a USB-C DMP device according to another object of the present invention described above includes: a step in which a power delivery module is supplied with power from a monitor or a television (TV) and provides the power to the Wi-Fi module, the converter module, and the system-on-chip (SoC) module, a step in which the Wi-Fi module receives a mirroring signal from a mobile terminal through Wi-Fi communication under the control of the SoC module; and a step in which the converter module converts the mirroring signal received by the Wi-Fi module into a USB-C (USB type-C) signal and transmits the USB-C signal to the monitor or the TV through a USB terminal under the control of the SoC module.

Here, the step in which the converter module converts the mirroring signal received by the Wi-Fi module into the USB-C (USB type-C) signal and transmits the USB-C signal to the monitor or the TV through the USB terminal under the control of the SoC module may include a step in which the converter module 150 converts a mirroring signal or a digital multimedia signal composed of the HDMI signal into the USB-C signal or converts the mirroring signal or the digital multimedia signal composed of the HDMI signal into a display port signal and then converts the display port signal into the USB-C signal.

A playback method of a USB-C DMP device according to another object of the present invention described above includes: a step in which a power delivery module is supplied with power from a monitor or a television (TV) and provides the power to the Bluetooth module, the converter module, and the system-on-chip (SoC) module; a step in which the Bluetooth module receives a voice signal from a voice recognition Bluetooth speaker through Bluetooth communication under the control of the SoC module; and a step in which the converter module converts the voice signal received by the Bluetooth module into a USB-C (USB type-C) signal and transmits the USB-C signal to the monitor or the TV through a USB terminal under the control of the SoC module.

Advantageous Effects

According to the above-described USB-C DMP device and the playback method thereof, the USB-C DMP device is configured to implement a DMP device in a USB-C scheme rather than an HDMI scheme, and thus there is an effect of being able to operate by directly receiving power from a TV or a monitor.

In addition, the USB-C DMP device is configured to receive a voice input through a separate voice input device, receive the voice input through Bluetooth communication or USB communication, or receive the voice input through I2C and I2S communication schemes to process the voice input, and thus, unlike a conventional method, there is an effect of smoothly processing a voice input of a remote user and implementing various functions.

DESCRIPTION OF REFERENCE NUMERALS

Figure 1:
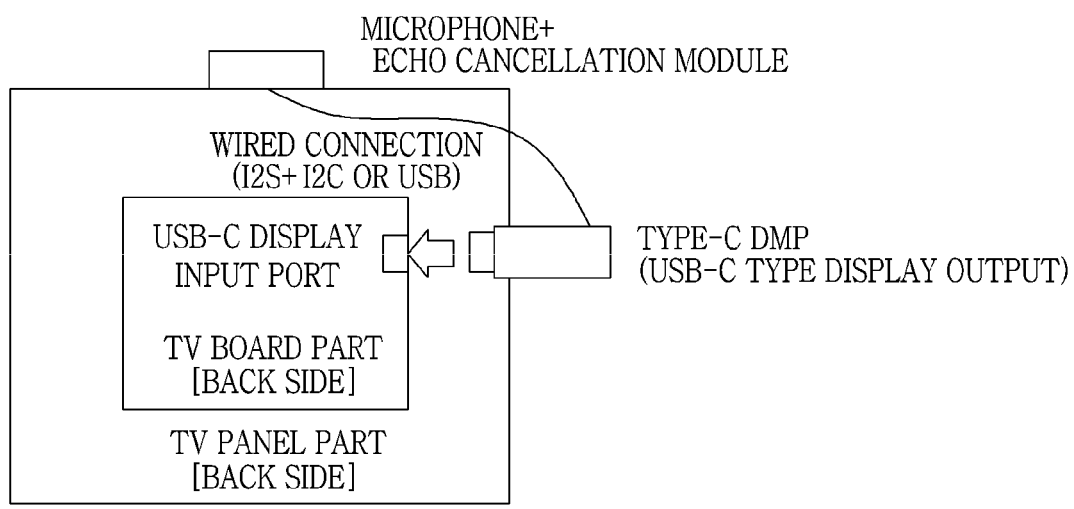
FIG. 1 is a schematic diagram of a USB-C DMP device and a voice input device according to an embodiment of the present invention.
Figure 1:
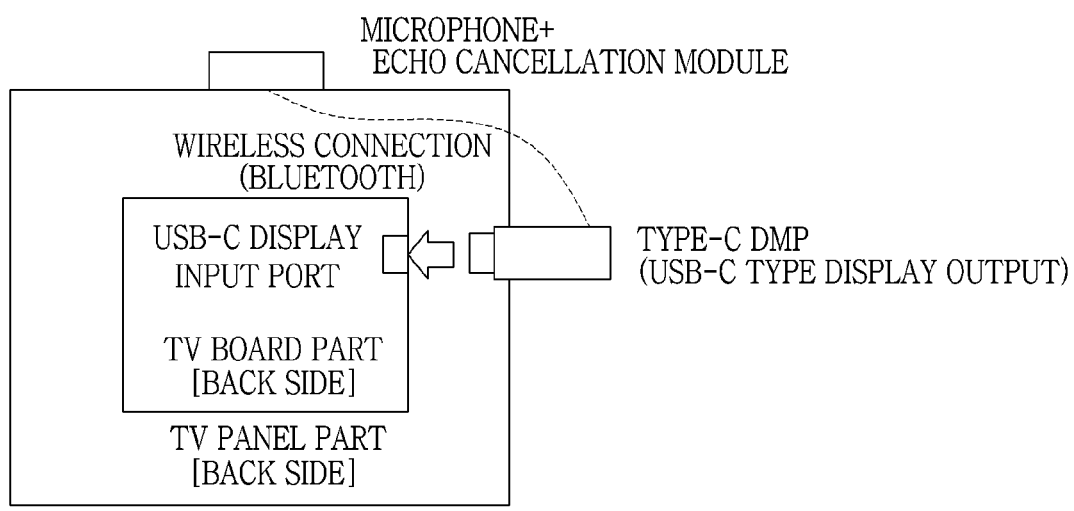

100: USB-C DMP device
110: USB terminal
120: Wi-Fi module
130: Bluetooth module
140: USB voice command receiving module
150: Converter module
160: SoC module
161: Memory module
170: Power delivery module
200: Voice input device
210: Microphone
220: Echo cancellation module
230: Bluetooth module

MODES OF THE INVENTION

The present invention may be subjected to various modifications and may have several embodiments, and thus specific embodiments thereof will be illustrated in the drawings and described in specific contents for carrying out the invention in detail. However, there is no intent to limit the present invention to specific embodiments, and it should be understood to include all modifications, equivalents, or alternatives that fall in the spirit and scope of the present invention. In describing each drawing, similar reference numerals are used for similar components.

The terms such as first, second, A, and B may be used to describe various elements, but the elements should not be limited by the terms. The terms are used only for distinguishing one element from other components. For example, the first element may be referred to as the second element without departing from the scope of the present invention, and similarly, the second element may be referred to as the first element. The terms and/or include a combination of a plurality of related entries or one of a plurality of related entries.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terms used in this application are only used to describe specific embodiments, and are not intended to limit the present invention. A singular expression includes a plural expression unless the context clearly refers to otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless defined otherwise, all terms used herein, including technical or scientific terms, have the same meaning as commonly understood by a person skilled in the art to which the present invention pertains. Terms such as those defined in a commonly used dictionaries should be interpreted as having a meaning that is consistent with their meaning in the context of the relevant art and are not interpreted as ideal or excessively formal meanings unless expressly defined in this application.

Hereinafter, preferred embodiments of the present invention will be described in detail with reference to the accompanying drawings.

FIG. 1 is a schematic diagram of a USB-C DMP device and a voice input device according to an embodiment of the present invention.

Referring to FIG. 1, a USB-C DMP device 100 is implemented in a USB-C scheme rather than an HDMI scheme, and is configured to operate by receiving power from a monitor 10 or a TV 20. Accordingly, a separate power adaptor is not required.

Meanwhile, it is configured to process a voice input by connecting a separate voice input device 200 to the USB-C DMP device 100 without receiving a user's voice input from a port on the back side of the monitor 10 or the TV 20.

In the related art, there was a problem that a voice of a remote user cannot be input from the back side of the monitor 10 or the TV 20, but there is an advantage that various functions can be implemented using a user's voice command as well as solving such a problem.

The voice input device 200 may be attached to the front or top of the monitor 10 or the TV 20 or installed in front thereof to receive a user's voice input. The voice input device 200 may be processed through the USB-C DMP device 100.

The voice input device 200 may transmit the user's voice to the USB-C DMP device 100 through a Bluetooth communication scheme or a USB communication scheme, or may transmit the user's voice to the USB-C DMP device 100 through an inter-integrated circuit (I2C) communication and an integrated interchip sound (I2S) communication.

Figure 2:
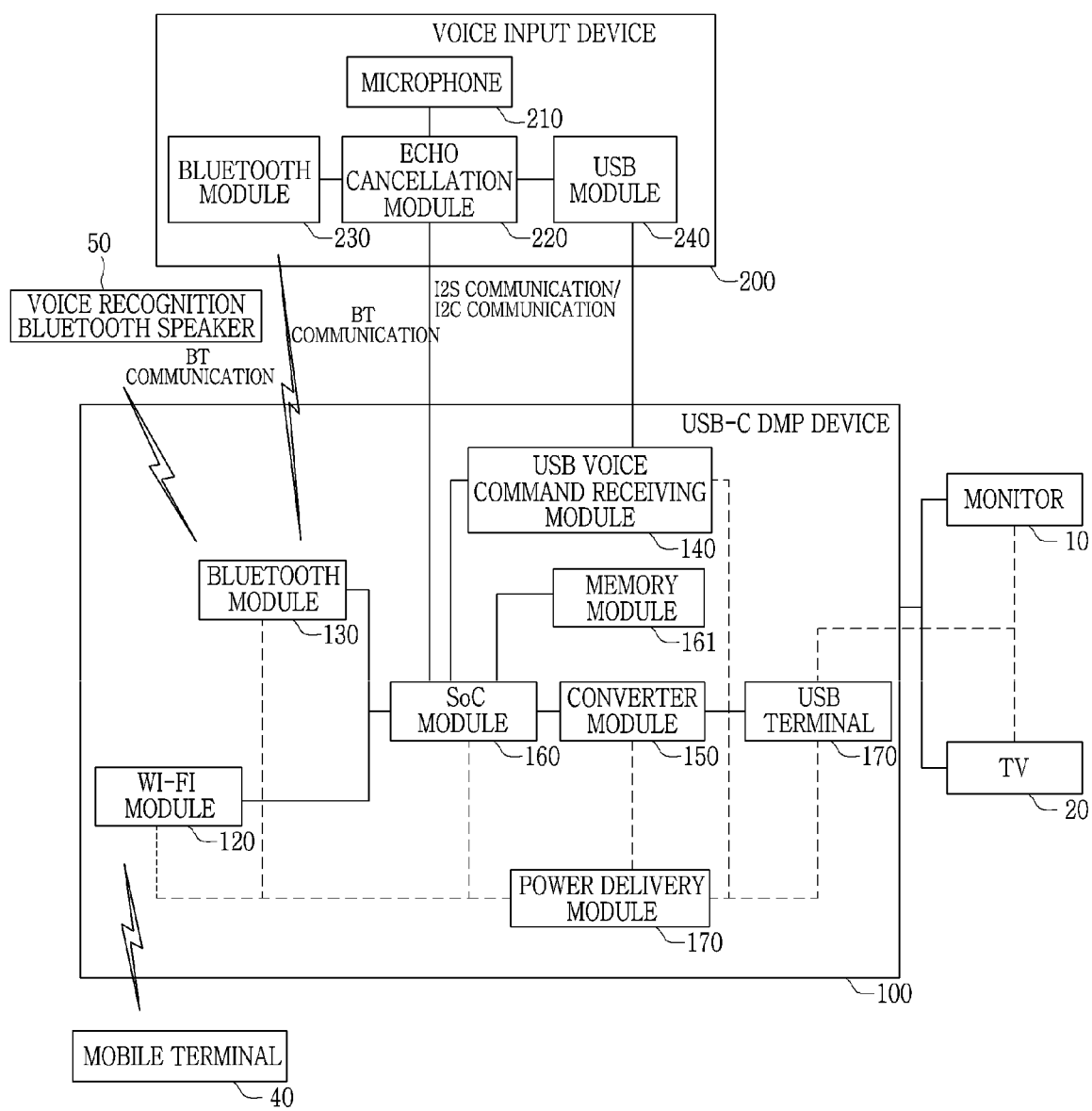
FIG. 2 is a block diagram of a USB-C DMP device and a voice input device according to an embodiment of the present invention.

FIG. 2 is a block diagram of a USB-C DMP device and a voice input device according to an embodiment of the present invention.

Referring to FIG. 2, a type-C universal serial device digital media player (USB-C DMP) device 100 according to an embodiment of the present invention includes a USB terminal 110, a Wi-Fi module 120, a Bluetooth module 130, a USB voice command receiving module 140, a converter module 150, a system-on-chip (SoC) module 160, a memory module 161, and a power delivery module 170.

In addition, the voice input device 200 may include a microphone 210, an echo cancellation module 220, a Bluetooth module 230, and a USB module 240.

Hereinafter, a detailed configuration will be described.

The USB terminal 110 is a configuration for connecting by inserting it into an input port of a monitor 10 or a TV 20.

The Wi-Fi module 120 may receive a mirroring signal or a digital multimedia signal from a mobile terminal 30 through Wi-Fi communication.

The Bluetooth module 130 may receive an audio signal from a voice recognition Bluetooth speaker 50 by Bluetooth communication. Here, the voice recognition Bluetooth speaker 50 is an artificial intelligence (AI) speaker, and may receive a user's voice command as well as an audio signal such as a sound source file to transmit them to the Bluetooth module 130.

In addition, the Bluetooth module 130 may receive the user's voice command from the Bluetooth module 230 of the voice input device 200. Here, the user's voice command is received through the microphone 210 of the voice input device 200, and the echo cancellation module 220 may output a user's voice command of clear sound quality with noise removed as a voice recognition preprocessor. The Bluetooth module 230 may transmit a user's voice command to the Bluetooth module 130. Meanwhile, the echo cancellation module 220 may directly transmit the denoised user's voice command to the SoC module 160 by wire. At this time, the user's voice command may be transmitted through the inter-integrated circuit (I2C) communication and the integrated interchip sound (I2S) communication.

The USB voice command receiving module 140 may receive the user's voice command output from the echo cancellation module 220 of the voice input device 200 through the USB communication scheme. Here, the USB module 240 of the voice input device 200 may transmit the user's voice command of clear sound quality with noise removed from the echo cancellation module 220 to the USB voice command receiving module 140 through the USB communication scheme.

The converter module 150 may convert the mirroring signal or digital multimedia signal received by the Wi-Fi module 120 into a USB-C signal.

Alternatively, the converter module 150 may convert a mirroring signal or a digital multimedia signal composed of an HDMI signal into the USB-C signal or convert the mirroring signal or the digital multimedia signal composed of the HDMI signal into a display port signal and then convert the display port signal into the USB-C signal.

In addition, the converter module 150 may convert the audio signal received from the voice recognition Bluetooth speaker 50 by the Bluetooth module 130 into the USB-C signal and transmit the USB-C signal to the monitor 10 or the TV 20 through the USB terminal 110.

The converter module 150 may transmit the USB-C signal to the monitor 10 or the TV 20 through the USB terminal 110.

The monitor 10 or the TV 20 may convert and output the USB-C signal into a display signal capable of playback.

The SoC module 160 may control the Wi-Fi module 120 to receive the mirroring signal or the digital multimedia signal from a mobile terminal 40, and may control the Bluetooth module 130 to receive the audio signal or the user's voice command from the voice recognition Bluetooth speaker 50. In addition, the SoC module 160 may control the USB voice command receiving module 140 to receive the user's voice command from the USB module 240 of the voice input device 200.

In addition, the SoC module 160 may control so that the mirroring signal or the digital multimedia signal received by the Wi-Fi module 120 and the audio signal received by the Bluetooth module 130 are converted into the USB-C signal by the converter module 150.

The converter module 150 may convert the audio signal received by the Bluetooth module 130 into the USB-C signal and transmit the USB-C signal to the monitor 10 or the TV 20 through the USB terminal 110.

The SoC module 160 may control so that the Bluetooth module 130 receives the audio signal from the voice recognition Bluetooth speaker 50 and the audio signal received by the Bluetooth module 130 is converted into the USB-C signal by the converter module 150.

Meanwhile, the SoC module 160 may recognize the user's voice command of the voice recognition Bluetooth speaker 50 or the user's voice command of the voice input device 200 to perform necessary processing.

For example, the SoC module 160 may perform a voice command such as pause, rewind, or forwarding of the mirroring signal, the digital media signal, or the audio signal. The SoC module 160 may store the mirroring signal, the digital media signal, and the audio signal in the memory module 161, and may implement playback functions such as pause, rewind, and forwarding with reference to the memory module 161.

The SoC module 160 may remember a time point at which playback is stopped.

Meanwhile, the SoC module 160 may monitor an intensity of a Wi-Fi signal between the Wi-Fi module 120 and the mobile terminal 40 in real time. When the Wi-Fi signal is received with an intensity equal to or greater than a certain intensity, the SoC module 160 may determine that a user of the corresponding mobile terminal 40 is in close proximity. In addition, the SoC module 160 may automatically playback the digital multimedia signal previously received from the corresponding mobile terminal 40 and stored in the memory module 161 from a playback stop point.

The power delivery module 170 may be supplied with power from the monitor 10 or the TV 20, and may provide the power to the Wi-Fi module 120, the Bluetooth module 130, the USB voice command receiving module 140, the converter module 150, the system-on-chip module 160, and the memory module 161.

Figure 3:
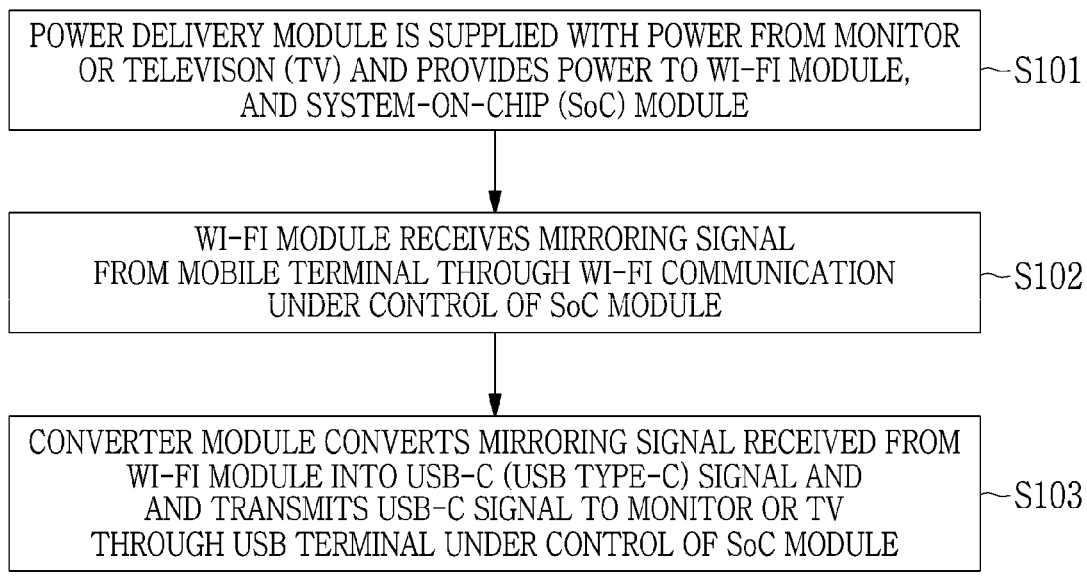
FIGS. 3 and 4 are flowcharts of a playback method of a USB-C DMP device according to an embodiment of the present invention.
Figure 4:
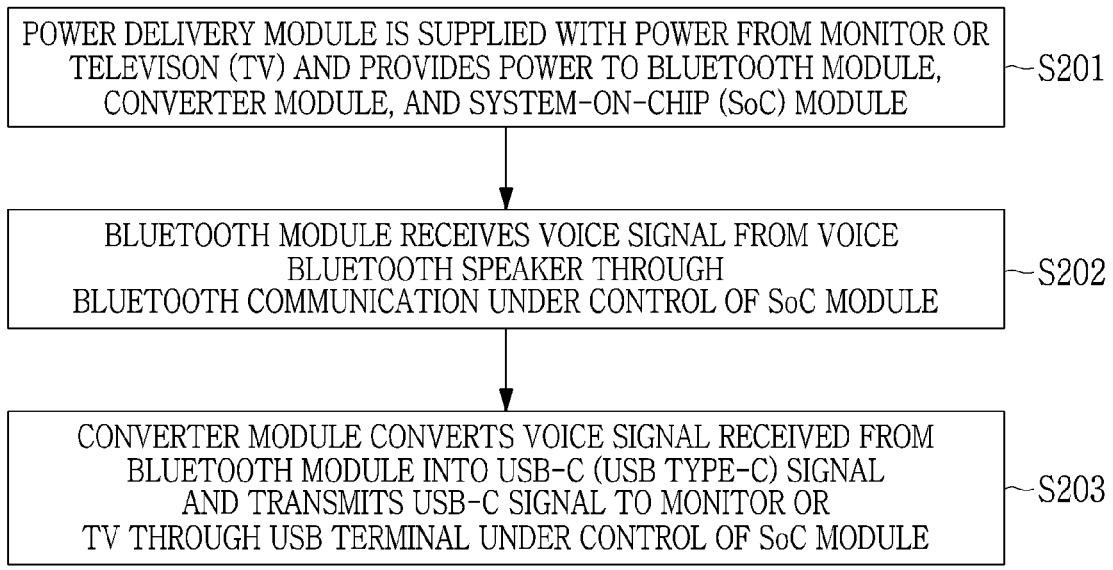

FIGS. 3 and 4 are flowcharts of a playback method of a USB-C DMP device according to an embodiment of the present invention.

First, referring to FIG. 3, the power delivery module 170 is supplied with power from the monitor 10 or the television (TV) 20 and provides the power to the Wi-Fi module 120, the converter module 150, and the system-on-chip (SoC) module 160 (S101).

Next, the Wi-Fi module 120 receives the mirroring signal from the mobile terminal 30 through Wi-Fi communication under the control of the SoC module 160 (S102).

Next, the converter module 150 converts the mirroring signal received by the Wi-Fi module 120 into the USB-C (USB type-C) signal and transmits the USB-C signal to the monitor 10 or the TV 20 through the USB terminal 110 under the control of the SoC module 160 (S103).

Here, the converter module 150 may convert a mirroring signal composed of an HDMI signal into the USB-C signal or convert the mirroring signal composed of the HDMI signal into a display port signal and then convert the display port signal into the USB-C signal.

In addition, referring to FIG. 4, the power delivery module 170 is supplied with power from the monitor 10 or the television (TV) 20 and provides the power to the Bluetooth module 130, the converter module 150, and the system-on-chip module 160 (S201).

Next, the Bluetooth module 130 receives the voice signal from the voice recognition Bluetooth speaker 40 through Bluetooth communication under the control of the SoC module 160 (S202).

Next, the converter module 150 converts the voice signal received by the Bluetooth module 130 into a USB-C (USB type-C) signal and transmits the USB-C signal to the monitor 10 or the TV 20 through the USB terminal 110 under the control of the SoC module 160 (S203).

Although the present invention has been described with reference to the embodiments, those skilled in the art may understand that the present invention may be variously modified and changed within a scope not departing from the spirit and scope of the present invention described in the following claims.

The invention claimed is:

1. A USB-C digital media player (DMP) device configured to receive a voice signal through a voice input device attached to a front or top of a monitor or a TV or installed in front thereof to receive the voice signal, the USB-C digital media player (DMP) device comprising:
   a first USB terminal for connecting to an input port of the monitor or the TV;
   a Wi-Fi receiver that receives a mirroring signal from a mobile terminal through Wi-Fi communication;
   a first Bluetooth device that receives the voice signal from a voice recognition Bluetooth speaker or the voice input device through Bluetooth communication;
   a converter that converts the mirroring signal received by the Wi-Fi receiver into a USB-C (USB type-C) signal and transmits the USB-C signal to the monitor or the TV through the first USB terminal; and
   a system-on-chip (SoC) that controls the Wi-Fi receiver to receive the mirroring signal from the mobile terminal, and controls to convert the mirroring signal received by the Wi-Fi receiver into the USB-C signal by the converter; and
   a USB voice command receiver that connects with the voice input device through USB communication, the voice input device comprising:
   a microphone that receives a user's voice command with noise;
   an echo cancellation device that outputs a denoised user's voice command or directly transmits the denoised user's voice command to the SoC by wire;
   a second Bluetooth device that transmits the denoised user's voice command from the echo cancellation device to the first Bluetooth device; and a second USB terminal that transmits the denoised user's voice command from the echo cancellation device to the USB voice command receiver through the USB communication.

2. The USB-C DMP device of claim 1, wherein the converter converts a mirroring signal composed of an HDMI signal into the USB-C signal or the mirroring signal composed of the HDMI signal into a display port signal and then converts the display port signal into the USB-C signal.

3. The USB-C DMP device of claim 1, wherein the converter converts the voice signal received by the first Bluetooth to the USB-C (USB type-C) signal and transmits the USB-C signal to the monitor or the TV through the first USB terminal, and
   the SoC controls the first Bluetooth to receive the voice signal from the voice recognition Bluetooth speaker, and to convert the voice signal received by the first Bluetooth into the USB-C signal by the converter.

4. The USB-C DMP device of claim 1, further comprising a power delivery device that is supplied with power from the monitor or the TV and provides the power to the Wi-Fi receiver, the first Bluetooth, the converter, and the system-on-chip.

* * * * *